United States Patent [19]
Camezon et al.

[11] Patent Number: 5,181,459
[45] Date of Patent: Jan. 26, 1993

[54] FRUIT INDENT REMOVAL DEVICE

[75] Inventors: Raymond E. Camezon; Klaus Silbermann, both of Danville, Calif.

[73] Assignee: California Processing Machinery, Danville, Calif.

[21] Appl. No.: 729,622

[22] Filed: Jul. 15, 1991

Related U.S. Application Data

[63] Continuation-in-part of Ser. No. 666,054, Mar. 7, 1991.

[51] Int. Cl.[5] .................... A23N 4/12; A23N 15/02; A23N 15/04; A23N 15/08
[52] U.S. Cl. ...................................... 99/546; 99/636; 99/642
[58] Field of Search ............... 99/540–542, 99/544, 546, 550, 586, 635, 636, 637, 642, 643; 426/482, 484

[56] References Cited

U.S. PATENT DOCUMENTS

| | | | |
|---|---|---|---|
| 1,494,617 | 5/1924 | Messler et al. | 99/642 |
| 3,030,991 | 4/1962 | Creed et al. | 99/546 |
| 3,186,459 | 6/1965 | Van Raay | 99/546 |
| 3,610,303 | 10/1971 | Loveland | 99/542 |
| 4,373,432 | 2/1983 | Tsutsumi | 99/636 |
| 4,453,458 | 6/1984 | Altman | 99/544 |
| 4,658,713 | 4/1987 | Nagaoka | 99/491 |
| 4,718,334 | 1/1988 | Nagaoka | 99/546 |
| 4,998,468 | 3/1991 | Nagaoka | 99/546 |
| 5,000,087 | 3/1991 | Nagaoka | 99/636 |

FOREIGN PATENT DOCUMENTS

| | | | |
|---|---|---|---|
| 0106279 | 6/1984 | Japan | 99/546 |
| 383714 | 11/1932 | United Kingdom | 99/546 |

Primary Examiner—Timothy F. Simone
Attorney, Agent, or Firm—Bielen, Peterson & Lampe

[57] ABSTRACT

A device removing the stem and blossom portions of fruit utilizing a support for the fruit which is capable of orienting the stem or the blossom portion of the fruit in an upright position. The support permits access to either the stem or blossom portion of the fruit and is spanned by a pair of fruit reamers. Each fruit reamer is capable of completely dressing out the stem and blossom portions of the fruit when the first and second reamers are brought toward one another.

21 Claims, 4 Drawing Sheets

FIG. 1

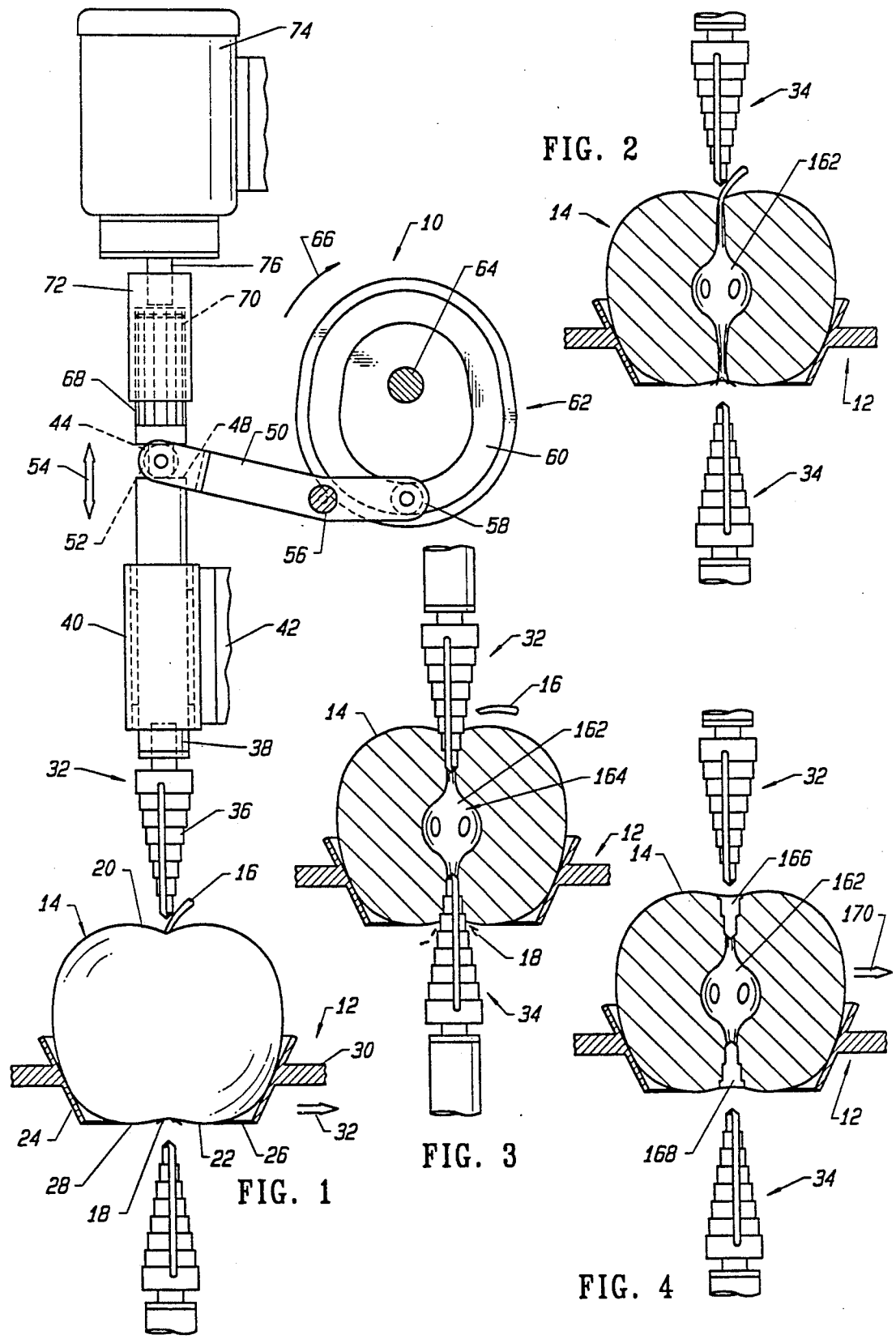

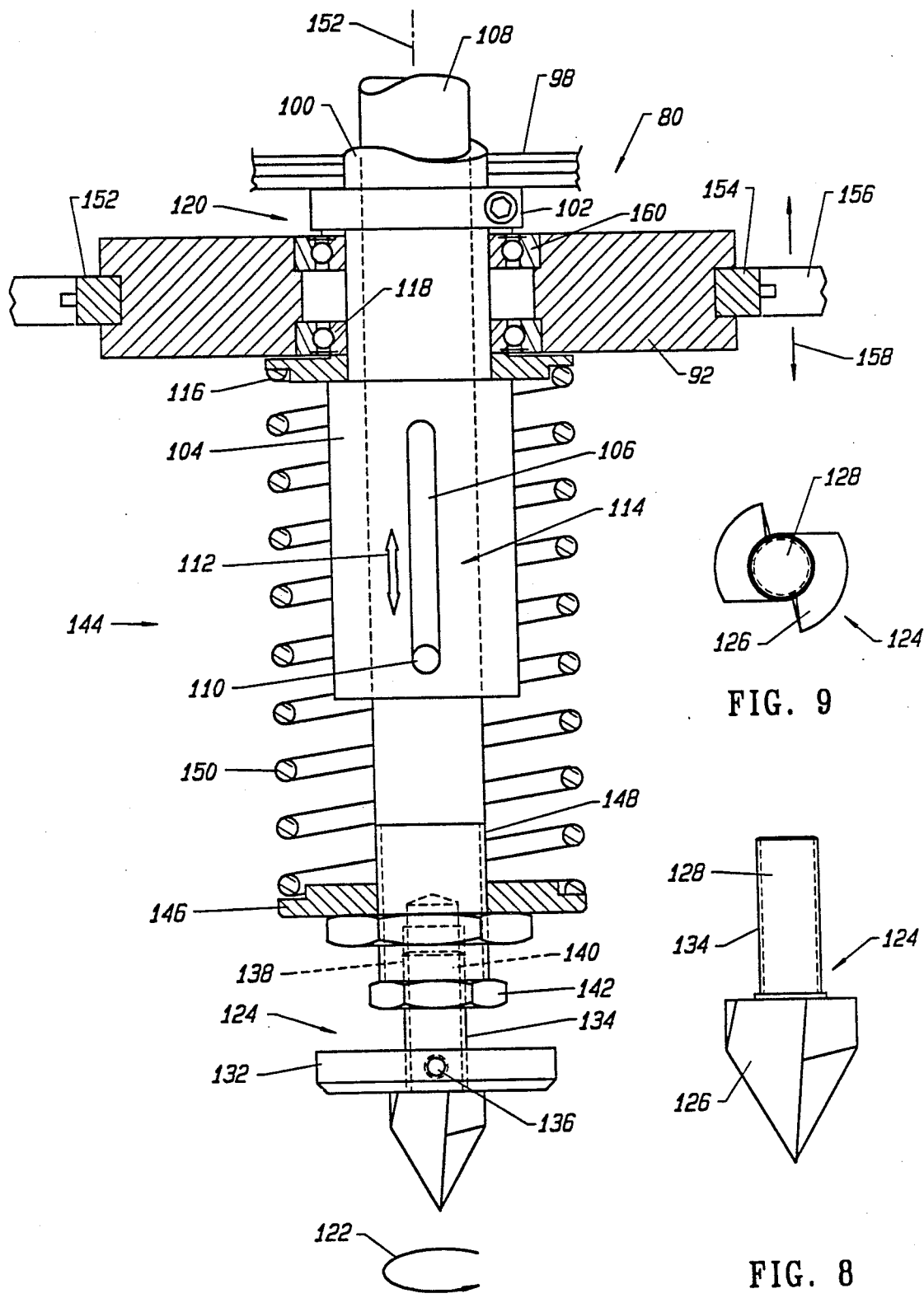
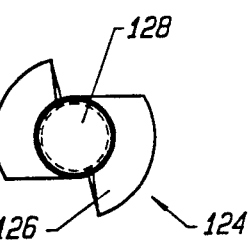
FIG. 7
FIG. 9
FIG. 8

FRUIT INDENT REMOVAL DEVICE

CROSS-REFERENCE TO RELATED APPLICATION

This application is a Continuation-In-Part of Ser. No. 07/666,054, filed Mar. 7, 1991.

BACKGROUND OF THE INVENTION

The present invention relates to a novel fruit indent removal device.

The production of fruit sauces, such as applesauce, entails the mass processing of raw fruit with the removal of the peels and other undersirable portions such as the stem and blossom cavities or indents, seed pods and the like.

In the case of apples, prior applesauce production methods have failed to entirely eliminate the blossom end or calyx material from contaminating the finished applesauce product. The calex material is often referred to as "fly legs", since it resembles the same. Unfortunately, applesauce containing "fly legs" and is downgraded is generally deemed to be unacceptable to the consumer. It has been found that seeds, seed cells, and stem portions pose less of a problem since they are easily filtered or screened later in the applesauce production process.

In the past, machines have been devised for peeling and coring apples in order to positively excise the stem and blossom portions of apples. Unfortunately, although successful in this regard, as much as 20% of the bulk of an individual apple is lost or wasted. For example U.S. Pat. No. 3,610,303 depicts a machine of this genre.

Complicating the process of apple indent removal is the fact that apples are not of uniform size and often are oriented stem side up or stem side down prior to coring or reaming.

A device which solves problems encountered in the prior art for producing fruit sauce, such as applesauce, would be a great advance in the food processing industry.

SUMMARY OF THE INVENTION

In accordance with the present invention a novel and useful device for removing the stem and blossom portions of a fruit body, such as an apple, is herein provided.

The device of the present invention employs a support for the fruit that is capable of selectively holding either the stem or blossom portion of a fruit apart from the support and in a upward position i.e.: stem side up or stem side down. Also, the support leaves the blossom and fruit portion accessible for contact of the same. The support may take the form of a seat having an aperture which is smaller than the smallest diameter of the fruit. The fruit, such as an apple, may be oriented manually or by automatic means known in the prior art.

The device of the present invention is also provided with first and second fruit reamers which are located above and below the fruit held by the support. Each reamer is capable of dressing out either the stem or blossom portions of the fruit without coring the same. In this regard, means is also found in the present invention for causing engagement of the first and second reamers with the fruit by decreasing the distance between the first and second reamers. In other words, the first reamer may be lowered, the second reamer may be raised, or both reamers may be moved toward one another within a short time span. Both reamers may be formed with augers which are rotated by a suitable motor means. It would be apparent that instead of rotating first and second auger with motor means, first and second augers may remain stationary while the fruit support is rotated. With reference to the first auger, a rotating shaft may be connected to a auger bit having a bit end and a base end. The rotating shaft, and thus the auger bit, is capable of moving longitudinally along the axis of the rotating shaft. Furthermore, a bushing may be connected to the motor means and surround the rotating shaft of the first auger. The bushing may include a slot which accepts a pin or protuberance extending from and connecting to the rotating shaft. The rotating shaft would be free to move longitudinally relative to the bushing, but would spin or turn with the bushing. A second reamer is located a predetermined distance and oppositely from the first reamer. In other words, the fruit lying on the seat is positioned between the first and the second reamers. It should also be noted, that the second reamer includes an auger which is rotated relative to the fruit.

The auger employed in the just described indent removal device may be defined to possess a relatively wide top portion converging to a relatively narrow bottom portion, a substantially converging surface being located there between. A relieved portion is formed along the substantially converging surface and encompasses a ramped portion therealong. Such ramped portion channels removed curlicued portions of the fruit from the body of the fruit. A flange having a cutting edge extends from the wide portion of the auger to further remove fruit flesh.

Means is also included in the present invention for causing the engagement of the first and second reamers with the fruit held on the support by decreasing the initial predetermined distance between the first and second reamers. Each of the reamers is capable of dressing out either the stem or blossom portions of the fruit without coring the same. Such means may include a plate located between the bit end and the base end of the first auger. Means, such as a cam operated device, would raise and lower the plate in a timed manner to coincide with the occupation of the support by a fruit such as an apple. A mounting body is also employed and connects to an inner race of a bearing while the support plate connects to outer race of the same bearing. In addition, the mounting body is attached to the bushing, heretofore described.

To accommodate fruits of different size, the means for causing engagement of the fruit may include a first and second flanges linked in separate positions relative to the rotating shaft. Spring means is located between the first and second flanges and is movable longitudinally with the rotatable shaft. In this regard, the first flange is longitudinally fixed relative to the rotatable shaft, preferably being fixed to the bushing. The second flange would be free to move longitudinally with the rotating shaft. Thus, a relatively large apple being reamed by the device of the present invention would force the first auger upwardly. The pin connected to the shaft and the slot of the bushing would also serve as stop means for limiting the stroke of the rotating shaft, tempered by the spring held between the pair of flanges. Each auger bit of the first and second augers of the first and second reamers may be constructed with a plate adjustably fixed around the auger. Such plate would limit the penetration of the auger into the apple being treated by the device of the present invention. Further, the first auger connected to the rotating shaft may also be adjusted in a longitudinal direction relative to such shaft. Such features would permit adjustment of the device of the present invention according to the size of the indents of a particular fruit such as an apple.

It may be apparent that a novel and useful device for removing the stem and blossom portions from a fruit has been described.

It is therefore an object of the present invention to provide a device for removing the stem and blossom portions of fruit which greatly reduces the wastage inherent in a coring process for the manufacture of fruit sauce and other fruit products.

It is another object of the present invention to provide a device for removing the stem and blossom portions of fruit which is susceptible to multiple parallel production lines, thus increasing the capacity of prior art circular coring machines.

Another object of the present invention is provide a device for removing the stem and blossom portions of a fruit which is relatively simple to manufacture and transport for use.

Yet another object of the present invention is to provide a device for removing the stem and blossom portions of fruit which is easily adjustable to differences in shape and size of a particular fruit, such as an apple, thus permitting continuous operations by eliminating down time to make adjustments necessary in the prior art food processing machines.

The invention possesses other objects and advantages especially as concerns particular characteristics and features thereof which will become apparent as the specification continues.

BRIEF DESCRIPTION OF THE DRAWINGS

FIG. 1 is a side elevational view of an embodiment of the present device in operation on an apple.

FIG. 2 is a sectional view of an apple held in a support prior to indent removal.

FIG. 3 is a sectional view of an apple in a support during the indent removal process.

FIG. 4 is a sectional view of an apple in a support after the indent removal process showing both augers in a retracted position.

FIG. 7 is a partial sectional view of the upper reamer depicted in FIGS. 5 and 6.

FIG. 8 is a front elevational view of the auger bit depicted in use in FIG. 7.

FIG. 9 is a top plan view of the auger bit depicted in FIG. 8.

Figure 5:
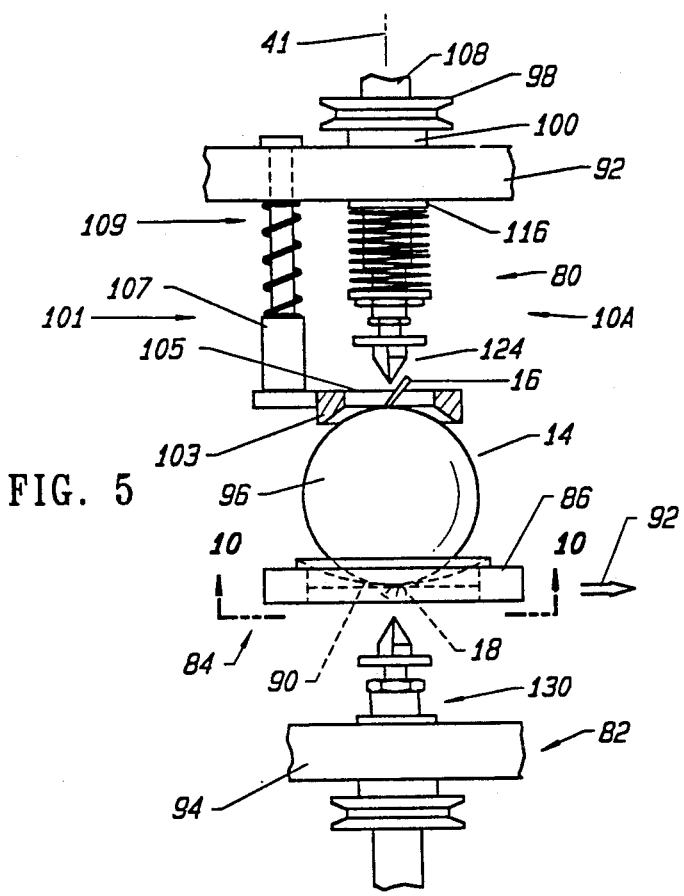
FIG. 5 is a side elevational view of another embodiment of the present invention prior to indent removal of an apple.

For a better understanding of the invention reference is made to the following detailed description of the preferred embodiments which should be referenced to the hereinabove described drawings.

DESCRIPTION OF THE PREFERRED EMBODIMENTS

Various aspects of the present invention will evolve from the following detailed description of the preferred embodiments thereof which should be taken in conjunction with the prior described drawings.

The invention as a whole is shown in the drawings by reference character 10. The fruit indent removing device 10 includes as one of its elements a support 12 for the fruit 14, which is depicted as an apple. Apple 14 possesses a stem 16 and the remnant of a full blossom 18, known as the cylex. In the fruit processing field the indent 20 adjacent the stem 16 is known as the stem indent and the depression surrounding the cylex 18 is known as the blossom indent 22. Apple 14 is depicted in FIG. 1 as being oriented with the stem indent 20 up and the blossom indent 22 down. Support 12 is in the form of a cup having wall portions 24 and bottom portion 26 with a central opening 28. Thus, support 12 permits access to the blossom indent 22 as well as the stem indent 20. It should also be noted, that apple 14 may be oppositely oriented such that the blossom indent 22 is up and the stem indent is down, for the purpose of processing afforded by the device 10 of the present invention. Structural member 30 is used to move support 12 according to directional arrow 32, it being understood that a support identical to support 12 is also connected to structural member 30 to present additional apples in the position of apple 14 depicted in FIG. 1.

Reamers 32 and 34 are also illustrated in FIG. 1 as being above and below apple 14, respectively. With reference to reamer 32, it should be understood that reamer 34 possesses a similar mechanism for turning and raising the same relative to apple 14. Reamer 32 includes a bit 36 which is connected to a collet shaft 38. Collet shaft 38 rotates and is capable of moving longitudinally within bearing 40 along axis 41, FIG. 7. The outer race of bearing 40 is connected to fixed structural member 42 which gives support to collet shaft 38. Collet shaft 38 includes a step-down shaft 44 which creates a pair of shoulders 46 and 48 serving as cam surfaces for cam follower arm 50 which takes the form of a yoke bracketing shaft 44. Rotatable member 52 rides on shoulders 46 and 48 and is capable of moving collet shaft 38, and another not shown, according to directional arrow 54. Cam follower arm 50 pivots at pivot point 56 and includes a cam follower 58 which travels within track 60 of cam 62. Cam 62 rotates about shaft 64 according to directional arrows 66. As previously stated, a similar arrangement would move reamer 34 upwardly into blossom indent 22. Collet shaft 38 terminates in a spline surface 68 which mates with the inner spline surface 70 of driving member 72. Motor 74 imparts rotational motion to motor shaft 76 which is linked to driving member 72. Again, a motor, such as motor 74, would also rotate reamer 34 below support 12.

Figure 6:
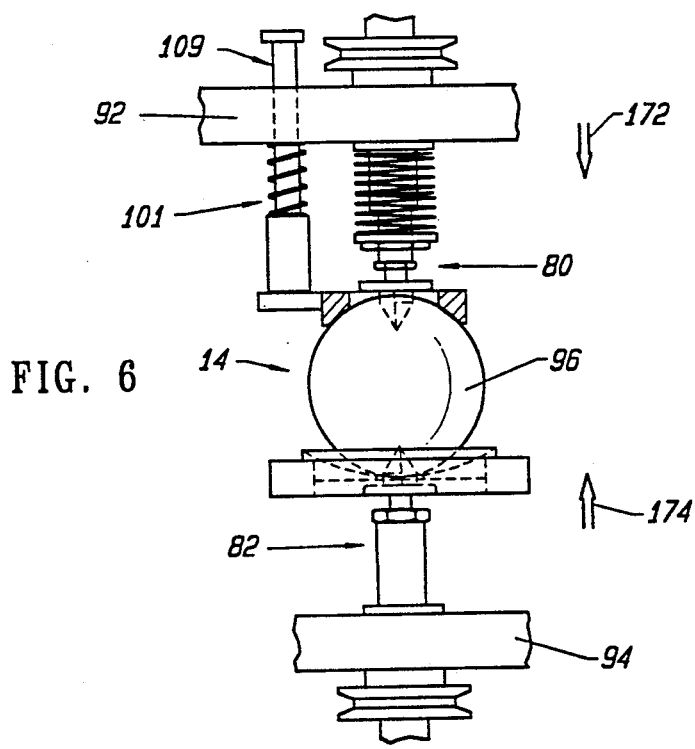
FIG. 6 is a side elevational view of the embodiment of FIG. 5 showing the indent removal process taking place on an apple.
Figure 10:
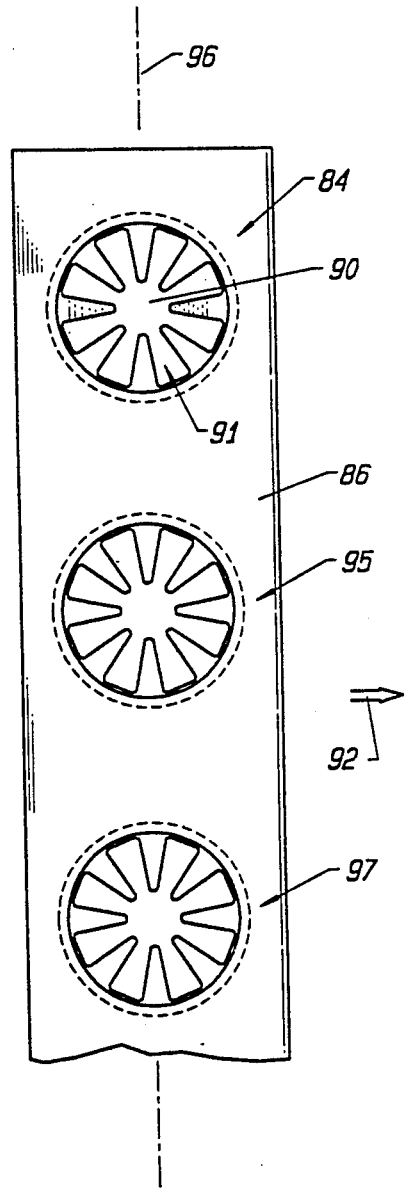
FIG. 10 is a view taken along line 10—10 of FIG. 5.
Figure 12:
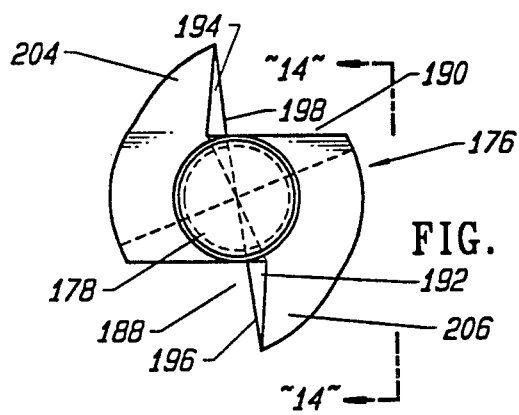
FIG. 12 is a top plan view of the auger of FIG. 11.
Figure 11:
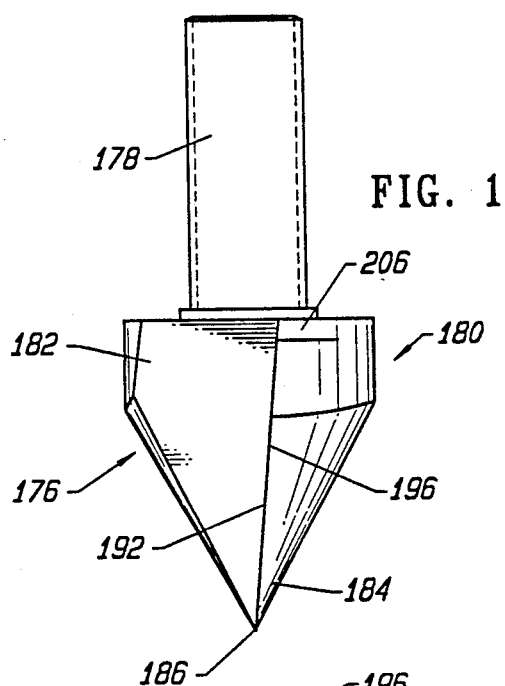
FIG. 11 is a side elevational view of an auger visible with the reaming device of the present invention.

Turning now to FIGS. 5 and 6, another embodiment 10A of the device of the present invention is depicted. Device 10A includes a first reamer 80 and a second reamer 82. Apple 14 is depicted schematically in FIGS. 5 and 6 but is oriented in the same way as in FIGS. 1-4, i.e. stem 16 up and blossom 18 end down. Support 84 includes an annular member 86 capped by a funnel member 88 having a central opening 90 formed by plurality of fingers 91, FIG. 10. It should be realized, that support 84 may take various forms each having an opening therethrough for access by lower reamer 82. In the mass processing aspect of device 10, support 84 is moved according to directional arrow 92 such that similar supports having other apples will subsequently be positioned between first and second reamers such as reamers 80 and 82 as shown in FIGS. 5 and 6. In addition, reamers 80 and 82 include support plates 92 and 94 which may extend perpendicularly to the FIGS. 5 and 6 illustrations and to support similar pairs of reamers. Thus, device 10 is susceptible to parallel lines of processing such that plates 92 and 94 will move downwardly and upwardly relative to apple 14, respectively and remove the indents from apple 14 and apples intersected by a plane containing axis 96 and lying perpendicular to the sheet containing FIGS. 5 and 6. As is apparent in FIG. 10, plate 86 includes supports 95 and 97 similarly constructed to support 84, in this regard. Moreover, stabilizer 101 is also depicted in FIGS. 5 and 6 for maintaining the upright orientation of apple 14. Stabilizer 101 includes a pressing member 103 possessing central opening 105. Pressing member 103 connects to bushing 107, which moves along spring loaded shaft 109, fastened to support plate 92. Of course parallel apples found in supports 95 and 97 will also include stabilizers similar to stabilizer 101.

Turning now to FIG. 7, reamer 80 is shown in further detail. Pulley 98 connects to hollow rotating shaft 100 by the use of clamp 102. Hollow rotating shaft 100 extends into and is fixed to a bushing 104 which includes a slot 106. Although bushing 104 is depicted as being a separate component from hollow rotating shaft 100, they may be formed as a unitary element. Inner shaft 108 lies within hollow rotating shaft 100 and bushing 104. Pin or protuberance 110 causes inner shaft 108 to turn or spin with hollow rotating shaft 100 and bushing 104. However, inner shaft 108 is free to move longitudinally along axis 152 relative to the encompassing elements, according to directional arrow 112.

Stop means 114 is also illustrated in FIGS. 7 for the relative movement of inner shaft 108 relative to busing 104. A flange 116 is fixed to inner race 118 of bearing 120. Bushing 104 and connected inner shaft 100 move together as a unit. Slot 106 and pin 110 define the relative longitudinal movement limits of inner shaft 108 relative to bushing 104. It should also be noted that pin 110 motivates inner shaft 108 relative to bushing 104 in a rotational direction according to directional arrow 122.

With reference to FIGS. 8 and 9, it may be observed that reamer 80 includes an auger 124 having a bit end 126 and a base portion 128. It may be apparent that reamer 82 also includes an auger 130 of similar construction. Auger 124 is provided with a plate 132 which threadingly engages the threaded outer surface 134 of base portion 128 of auger 124. A set screw 136 fixes plate 132 along outer surface 134 to set the penetration depth of bit 126 of auger 124 into apple 14. In addition, inner shaft 108 includes a threaded inner portion 138 which adjusts the distance that base portion 128 extends within the cavity 140 surrounded by threaded inner portion 138 of inner shaft 108. Nut 142 holds auger 124 in place relative to inner shaft 108.

Moreover, means 144 is shown in FIG. 7 for accommodating the reaming of fruits such as apples of different height and diameter. Namely, a flange 146 cuttingly engages a threaded outer portion 148 of inner shaft 108. A coil spring 150 engages flange 116 and flange 146 to urge inner shaft 108 and auger 124 downwardly. Spring 150 would permit auger 124 to remain in a longitudinal position along axis 152 with the downward movement of bushing 104, which will be explained hereinafter. The position of flange 146 determines the tension on spring 150 which in turn determines the force of penetration of auger 124. This adjustment depends on the hardness or softness of the flesh of the apple 14 being reamed. It is believed that the shape of bit 126 is suitable for reaming apples, however other shapes may suffice in this regard. In addition, the removal of indents 20 and 22 from apple 14 may be achieved by mechanisms other than rotating augers depicted in the embodiments shown herein.

Returning to FIG. 7 it may be observed that support plate 92 connected to removable keyed portions 152 and 154 which are linked to a cam arm 156 which operates similarly to the cam depicted in FIG. 1. Consequently plate 92 moves upwardly and downwardly according to directional arrow 158. It may also be observed that plate 92 is fixed to outer race 160 of bearing 120.

Figure 14:
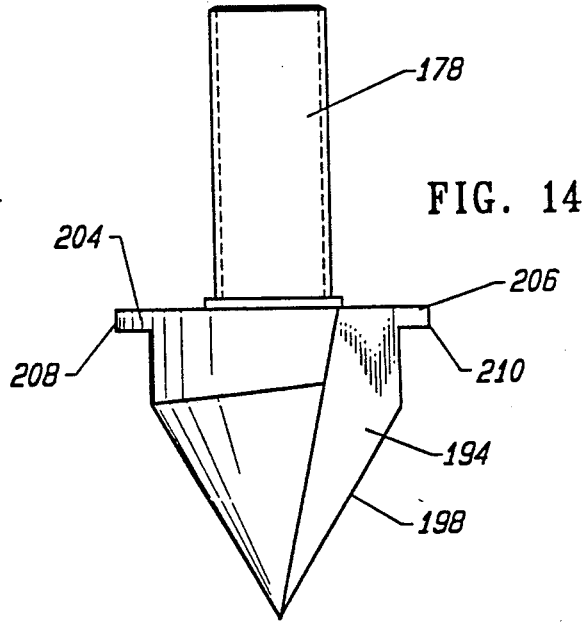
FIG. 14 is a side elevational view taken along line 14—14 of FIG. 12.
Figure 13:
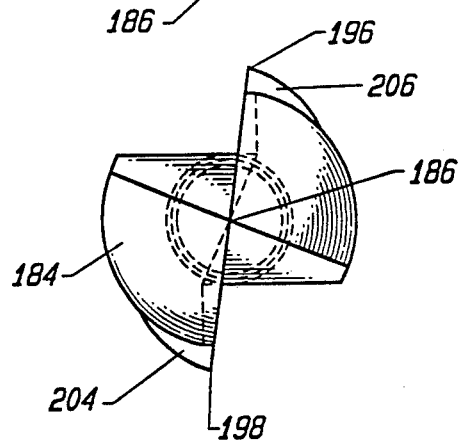
FIG. 13 is a bottom plan view of the auger of FIG. 11.
Figure 15:
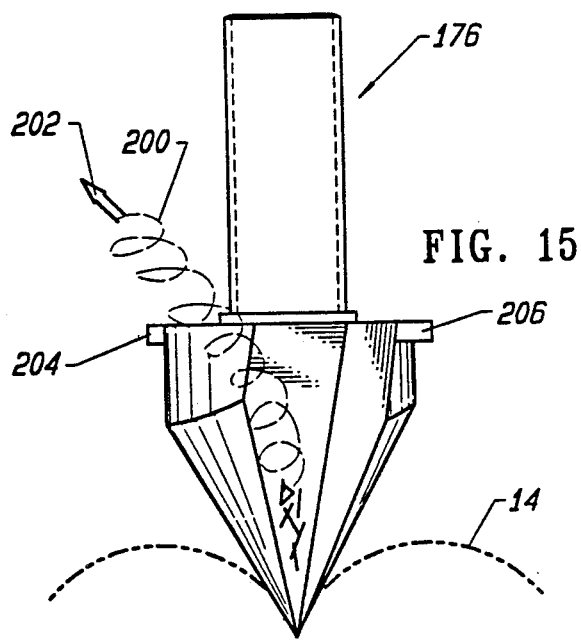
FIG. 15 is a front elevational view of the auger depicted in FIGS. 11-14, reaming an apple.

Turning now to FIGS. 11-15, an auger 176 is depicted in substitution for auger 124 of FIG. 8. Auger 176 includes a shaft 178 terminating a cutting bit portion 180. Cutting bit portion 180 of auger 176 includes a relatively wide upper portion 182 which converges to a relatively narrow bottom portion 184, terminating in tip 186. Auger 176 includes relieved areas 188 and 190, FIG. 12, having ramped surfaces 192 and 194, respectively. Ramped surfaces 192 and 194 extend outwardly from base 178 to cutting edges 196 and 198. Relieved portions 188 and 190 provide space for the cut or waste matter deriving from the flesh of the fruit 14 being reamed by device 10. Such cut matter is usually in the form of a curlicue. Ramped surfaces 192 and 194 direct such waste matter 200, FIG. 15 upwardly and outwardly from auger 176, directional arrow 202, FIG. 15. Flanges 204 and 206 extend outwardly from top portion 182. Edges 208 and 210, FIG. 14, are capable of further cutting, the top portion of apple 14 to ensure complete removable of the fly legs.

In operation, with respect to the embodiments shown in FIGS. 1-4, the user advances an apple 14 within support 12 to the position shown in FIG. 1 by manual or automated means known in the prior art, directional arrow 160. Cam 62 is timed to turn via shaft 64 such that cam follower arm 50 lowers collet shaft 38 and bit 36 downwardly into stem indent 20. Motor 74, through driving member 72 and collet shaft spline surface 68, turns bit 36. A similar mechanism is utilized to raise and turn reamer 34 below apple 14 into blossom indent 18. As previously discussed, apple 14 may be turned upside down relative to its depiction in FIGS. 1-6 such that the stem 16 is facing downwardly. Turning to FIG. 3, it may be observed that reamers 32 and 34 dress out stem and blossom indents 20 and 22, leaving the seed cell 162 relatively intact. It should be noted that the seeds 164 and seed cell 162 may be easily removed from apple 14 at a later stage by filtering. Turning now to FIG. 4, it should be observed that cam 62 and another similar cam (not shown) are then timed to retract reamers 32 and 34 from apple 14. It should be noted that cavities 166 and 168, with stem and cylex removed, respectively, have been formed in apple 14 by the reaming process heretofore described. With respect to the embodiments shown in FIGS. 5-10, a similar indent reaming device is depicted where augers 124 and 130 are moved toward one another according to directional arrows 172 and 174. The movement of support plates 92 and 94, and thus, augers 124 and 130, are accomplished by a cam mechanism similar to that shown in FIG. 1 or by conventional means. Also augers 124 and 130 may be turned by motor means and linkages such as those depicted in FIG. 1 relative to reamer auger 32. Auger 176 may be substituted for either auger 124 or 130 in the reaming process herein before described. After reaming by either the disclosed devices 10 or 10A, exemplar apple 14 is then moved by support 12 according to directional arrow 170 for further processing which may include peeling, crushing, grating, and the like in the production of applesauce.

While in the foregoing embodiments of the invention have been set forth in considerable detail for the purpose of making a complete disclosure of the invention it may be apparent to those of skill in the art that numerous changes may be made in such details without departing from the spirit and principles of the invention.

What is claimed is:

1. A device for removing the stem and blossom portions of fruit comprising:
   a. a support for the fruit, said support being capable of selectively holding the stem and blossom portions of the fruit apart from said support, said stem and blossom portions of the fruit being accessible;
   b. a first reamer including a first auger having a rotating shaft and means for moving said rotating shaft longitudinally;
   c. a second reamer located at a predetermined distance and oppositely from said first reamer, said second reamer including a second auger, said first and second reamers being located adjacent said fruit held on said support and being capable of dressing out said stem and blossom portions of the fruit; and
   d. means for causing engagement of said first and second reamers with the fruit by decreasing said predetermined distance between said first and second reamers, said means for causing engagement of said and second reamers including a first flange and a second flange, said first and second flanges being linked to and positioned apart relative said rotating shaft, and spring means spanning said first and second flanges, and said second flange being movable longitudinally with said rotatable shaft, said first flange being longitudinally fixed relative to said rotatable shaft.

2. A device for removing the stem and blossom portions of fruit, comprising:
   a. a support for the fruit, said support being capable of selectively holding the stem and blossom portions of the fruit apart from said support, said stem and blossom portions of the fruit being accessible;
   b. a first reamer including a first auger having a rotating shaft, means for moving said rotating shaft longitudinally, a bit end, and a base portion, said base portion of said first auger being adjustably connected longitudinally relative to said rotating shaft,
   c. a second reamer located at a predetermined distance and oppositely from said first reamer, said second reamer including a second auger said first and second reamers being located adjacent said fruit held on said support and being capable of dressing out said stem and blossom portions of the fruit; and
   d. means for causing engagement of said first and second reamers with the fruit by decreasing said predetermined distance between said first and second reamers.

3. The device of claim 1 which additionally comprises stop means for limiting longitudinal movement between said first and second flanges.

4. The device of claim 3 in which said stop means includes a bushing connected to said first flange and surrounding said rotating shaft, said bushing possessing a slot, said rotating shaft possessing a protuberance capable of traveling within said slot and contacting said bushing.

5. The device of claim 2 in which said first auger further includes a plate located between said bit end and said base end of said first auger.

6. The device of claim 5 in which said plate includes means for adjusting said location of said plate between said bit end and said base end of said first auger.

7. The device of claim 1 which further includes a mounting body and a bearing positioned between said mounting body and said rotating shaft.

8. The device of claim 1 in which said support for the fruit includes a seat having an aperture therethrough, said aperture permitting passage of said second auger.

9. The device of claim 1 in which said second auger further includes a plate adjustably fixed thereto to limit penetration of said auger into the fruit.

10. The device of claim 4 in which said bushing connects to a driving mechanism, capable of turning said rotating shaft and said surrounding bushing.

11. The device of claim 4 which further includes means for moving said mounting body and moving said rotating shaft longitudinally, thereby.

12. The device of claim 11 in which said bushing connects to a driving mechanism capable of turning said rotating shaft and said surrounding bushing.

13. The device of claim 1 which additionally includes a stabilizer for maintaining the holding of the fruit in said support.

14. The device of claim 1 in which said first auger includes relatively wide a top portion converging to a relatively narrow bottom portion and including a substantially converging surface therebetween, said auger further including one relieved portion along said substantially converging surface, and one ramped portion along said converging surface at said one relieved portion.

15. The device of claim 14 in which said first auger further includes a flange extending from said relatively wide portion of said auger, said flange including an edge portion being capable of cutting the fruit.

16. The device of claim 15 in which said first auger includes another relieved portion along said substantially converging surface, and another ramped portion along said converging surface at said one relieved portion.

17. The device of claim 1 in which said first and second augers each includes relatively wide top portions converging to a relatively narrow bottom portion and including a substantially converging surface therebetween, said auger further including one relieved portion along said substantially converging surface, and one ramped portion along said converging surface at said one relieved portion.

18. The device of claim 17 in which said first and second augers each includes a flange extending from said relatively wide portion of said auger, said flange including an edge portion being capable of cutting the fruit.

19. The device of claim 18 in which said first and second auger each includes another relieved portion along said substantially converging surface, and another ramped portion along said converging surface at said one relieved portion.

20. The device of claim 1 which further comprises motor means for causing relative rotation between the fruit and said first and second augers.

21. A device for removing the stem and blossom portions of fruit, comprising:
   a. a support for the fruit, said support being capable of selectively holding the stem and blossom portions of the fruit apart from said support, said stem and blossom portions of the fruit being accessible;
   b. a first reamer including a first auger having a shaft, means for moving said shaft longitudinally, a bit end, and a base portion, said base portion of said first auger being adjustably connected longitudinally relative to said rotating shaft,
   c. a second reamer located at a predetermined distance and oppositely from said first reamer, said second reamer including a second auger said first and second reamers being located adjacent said fruit held on said support and being capable of dressing out said stem and blossom portions of the fruit;
   d. means for providing rotational movement between said support and said first and second auger, and
   e. means for causing engagement of said first and second reamers with the fruit by decreasing said predetermined distance between said first and second reamers.

* * * * *